United States Patent
Turaga et al.

(10) Patent No.: US 7,023,923 B2
(45) Date of Patent: Apr. 4, 2006

(54) MOTION COMPENSATED TEMPORAL FILTERING BASED ON MULTIPLE REFERENCE FRAMES FOR WAVELET BASED CODING

(75) Inventors: Deepak S. Turaga, Croton on Hudson, NY (US); Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 666 days.

(21) Appl. No.: 10/218,214

(22) Filed: Aug. 13, 2002

(65) Prior Publication Data

US 2003/0202598 A1 Oct. 30, 2003

Related U.S. Application Data

(60) Provisional application No. 60/376,381, filed on Apr. 29, 2002.

(51) Int. Cl.
*H04N 7/12* (2006.01)
(52) U.S. Cl. ................................. 375/240.19
(58) Field of Classification Search ............... 348/416, 348/409, 397, 700, 402, 411, 413, 452, 412; 348/420, 699; 375/240.19, 240.12, 240.16, 375/240.18, 240.24; 382/240, 284, 236, 382/238, 239, 232
See application file for complete search history.

(56) References Cited

U.S. PATENT DOCUMENTS

| | | | |
|---|---|---|---|
| 5,301,020 A | 4/1994 | Cassereau | 368/415 |
| 5,862,261 A * | 1/1999 | Lee | 382/236 |
| 6,212,235 B1 | 4/2001 | Nieweglowski et al. | 375/240.08 |
| 6,842,483 B1 * | 1/2005 | Au et al. | 375/240.16 |
| 2003/0026341 A1 * | 2/2003 | Li | 375/240.19 |
| 2004/0184541 A1 * | 9/2004 | Brockmeyer et al. | 375/240.16 |
| 2005/0078875 A1 * | 4/2005 | Zhang et al. | 382/240 |

OTHER PUBLICATIONS

Motion compensated 3-D sub-band coding of video, John Woods, 1999, 155-167.*
Gary J. Sullivan et al; "Using the Draft H-26L Video Coding Standard for Mobile Applications".
Scung-Jong Choi et al; "Motion-Compensated 3-D Subband Coding of Video", IEEE Transactions on Image Processing, vol. 8, No. 2 Feb. 1999.
Jens-Rainer; "Three-Dimensional Subband Coding with Motion Compensation", IEEE Transactions on Image Processing, vol. 3, No. 5, Sep. 1994.
"Long-Term Memory Motion-Compensated Prediction" by Wiegand et al, IEEE Transactions on Circuits and Systems for Video Technology, vol. 9, No. 1, Feb. 1999, pp. 70-84, XP00802288.
"Unconstrained Motion Compensated Temporal Filtering" by Turaga et al, International Organisation for Standardisation, ISO/IEC JTC1/SC29/WG11, M8388, May 2002, XP002260700.

* cited by examiner

*Primary Examiner*—Vu Le
*Assistant Examiner*—Behrooz Senfi

(57) ABSTRACT

The present invention is directed to a method and device for encoding a group of video frames. According to the present invention, regions in at least one frame in the group are matched to regions in multiple reference frames. The difference between pixel values of the regions in the at least one frame and the regions in the multiple reference frames is calculated. The difference is transformed into wavelet coefficients. The present invention is also directed to a method and device for decoding a group of frames by performing the inverse of the above described encoding.

29 Claims, 4 Drawing Sheets

OLD SCHEME — NEW SCHEME

MOTION COMPENSATED TEMPORAL FILTERING BASED ON MULTIPLE REFERENCE FRAMES FOR WAVELET BASED CODING

CROSS REFERENCE TO RELATED APPLICATIONS

The present application claims the benefit of U.S. Provisional Application Ser. No. 60/376,381, filed on Apr. 29, 2002, the teachings of which are incorporated herein by reference.

The present application is related to U.S. application Ser. No. 10/218,221, entitled "Scalable Wavelet Based Coding Using Motion Compensation Temporal Filtering Based On Multiple Reference Frames" and U.S. application Ser. No. 10/218,213, entitled "Wavelet Based Coding Using Motion Compensated Temporal Filtering Based On Both Single And Multiple Reference Frames", being filed concurrently herewith.

BACKGROUND OF THE INVENTION

The present invention relates generally to video compression, and more particularly, to wavelet based coding utilizing multiple reference frames for motion compensated temporal filtering.

A number of the current video coding algorithms are based on motion compensated predictive coding, which are considered hybrid schemes. In such hybrid schemes, temporal redundancy is reduced using motion compensation, while spatial redundancy is reduced by transform coding the residue of motion compensation. Commonly used transforms include the discrete cosine transform (DCT) or sub-band/wavelet decompositions. Such schemes, however, lack flexibility in terms of providing true scalable bit streams.

Another type of scheme known as 3D sub-band/wavelet (hereafter "3D wavelet") based coding has gained popularity especially in the current scenario of video transmission over heterogeneous networks. These schemes are desirable in such application since very flexible scalable bit streams and higher error resilience is provided. In 3D wavelet coding, the whole frame is transformed at a time instead of block by block as in DCT based coding.

One component of 3D wavelet schemes is motion compensated temporal filtering (MCTF), which is performed to reduce temporal redundancy. An example of MCTF is described in an article entitled "Motion-Compensated 3-D Subband Coding of Video", IEEE Transactions On Image Processing, Volume 8, No. 2, February 1999, by Seung-Jong Choi and John Woods, hereafter referred to as "Woods".

In Woods, frames are filtered temporally in the direction of motion before the spatial decomposition is performed. During the temporal filtering, some pixels are either not referenced or are referenced multiple times due to the nature of the motion in the scene and the covering/uncovering of objects. Such pixels are known as unconnected pixels and require special handling, which leads to reduced coding efficiency. An example of unconnected and connected pixels is shown in FIG. 1, which was taken from Woods.

SUMMARY OF THE INVENTION

The present invention is directed to a method and device for encoding a group of video frames. According to the present invention, regions in at least one frame in the group are matched to regions in multiple reference frames. The difference between pixel values of the regions in the at least one frame and the regions in the multiple reference frames is calculated. The difference is transformed into wavelet coefficients.

The present invention is also directed to a method and device for decoding a bit-stream including a group of encoded video frames. According to the present invention, the bit-stream is entropy decoded to produce wavelet coefficients. The wavelet coefficients are transformed to produce partially decoded frames. At least one partially decoded frame is inverse temporally filtered using multiple reference frames.

In one example, the inverse temporal filtering includes regions being retrieved from the multiple reference frames previously matched to regions in the at least one partially decoded frame and pixel values of the regions in the multiple reference frames being added to pixel values of the regions in the at least one partially decoded frame.

BRIEF DESCRIPTION OF THE DRAWINGS

Referring now to the drawings were like reference numbers represent corresponding parts throughout.

DETAILED DESCRIPTION

As previously described, one component of 3D wavelet schemes is motion compensated temporal filtering (MCTF), which is performed to reduce temporal redundancy. During the MCTF, unconnected pixels may result that require special handling, which reduces the coding efficiency. The present invention is a directed towards a new MCTF scheme that uses multiple reference frames during motion estimation and temporal filtering in order to significantly improve the quality of the match and also to reduce the number of unconnected pixels. Therefore, this new scheme provides improved coding efficiency by improving the best matches and also reducing the number of unconnected pixels.

Figure 2:
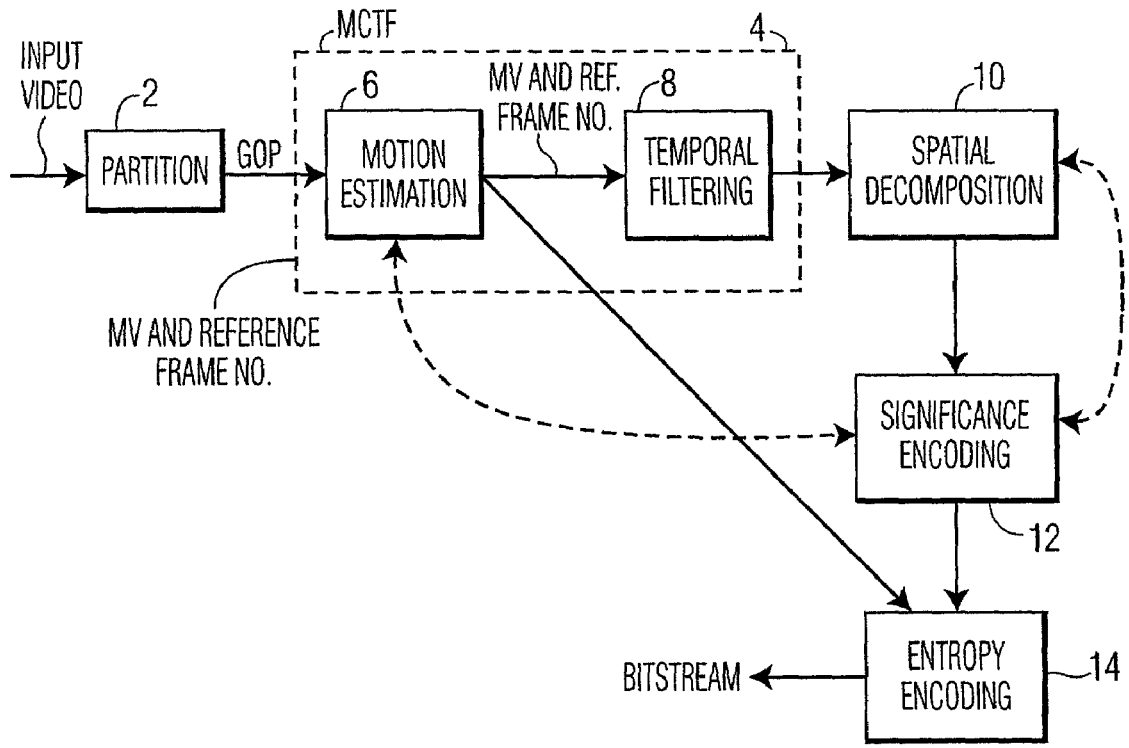
FIG. 2 is a block diagram of one example of an encoder according to the present invention.

One example of encoder according to the present invention is shown in FIG. 2. As can be seen, the encoder includes a partitioning unit 2 for dividing the input video into a group of pictures (GOP), which are encoded as a unit. According to the present invention, the partition unit 2 operates so that the GOP includes a predetermined number of frames or are determined dynamically during operation based on parameters such as bandwidth, coding efficiency, and the video content. For instance, if the video consists of rapid scene changes and high motion, it is more efficient to have a shorter GOP, while if the video consists of mostly stationary objects, it is more efficient to have a longer GOP.

As can be seen, a MCTF unit 4 is included that is made up of a motion estimation unit 6 and a temporal filtering unit 8. During operation, the motion estimation unit 6 performs motion estimation on the frames in each GOP. As previously described, the motion estimation performed on each GOP will be based on multiple reference frames. Thus, groups of pixels or regions in the frames of the GOP will be matched to similar groups of pixels in other frames of the same GOP. Therefore, the other frames in the GOP are the reference frames for each frame processed.

In one example, the motion estimation unit 6 will perform backward prediction. Thus, groups of pixels or regions in one or more frames of the GOP will be matched to similar groups of pixels or regions in previous frames of the same GOP. In this example, the previous frames in the GOP are the reference frames for each frame processed. Since each GOP is processed as a unit, the first frame may not be processed since no previous frames are available. However, alternatively, the first frame may be forward predicted in another example.

In another example, the motion estimation unit 6 will perform forward prediction. Thus, groups of pixels or regions in one or more frames of the GOP will be matched to similar groups of pixels or regions in proceeding frames of the same GOP. In this example, the proceeding frames in the GOP are the reference frames for each frame processed. Since each GOP is processed as a unit, the last frame may not be processed since there are not any previous frames available. However, alternatively, the last frame may be backward predicted in another example.

In another example, the/motion estimation unit 6 will perform bi-directional prediction. Thus, groups of pixels or regions in one or more frames of the GOP may be matched to similar groups of pixels or regions in both previous and proceeding frames of the same GOP. In this example, the previous and proceeding frames in the GOP are the reference frames for each frame processed. Since each GOP is processed as a unit, the first and last frame of the GOP will not be processed bi-directionally. Therefore, in this example, either the first or last frame may not be processed by the motion estimation unit 6 and, the other one will be either be forward or backward predicted.

As a result of the above described matching, the motion estimation unit 6 will provide a motion vector MV and a frame number for each region matched in the current frame being processed. In some cases, there will be only one motion vector MV and frame number associated with each region in the current frame being processed. However, if bi-directional prediction is used, there may be two motion vectors MV and frame numbers associated with each region. Each motion vector and frame number will indicate the position and the other frame in the GOP that includes the similar region matched to the region in each frame processed.

Figure 1:
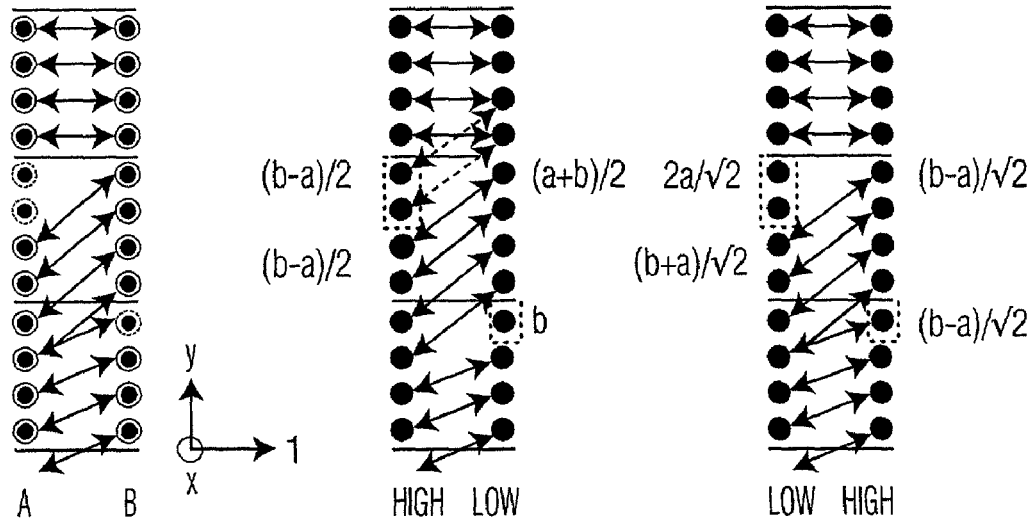
FIG. 1 is a diagram illustrating aspects of a known motion compensated temporal filtering technique.

During operation, the temporal filtering unit 8 removes temporal redundancies between the frames of each GOP according to the motion vectors MV and frame numbers provided by the motion estimation unit 6. As can be seen from FIG. 1, the MCTF of Woods (an article entitled "Motion-Compensated 3-D Subband Coding of Video", IEEE Transactions On Image Processing, Volume 8, No. 2, February 1999, by Seung-Jong Choi and John Woods) takes two frames and transforms these frames into two sub-bands including a low sub-band and a high sub-band. The low sub-band corresponds to the (scaled) average of corresponding pixels in the two frames, while the high sideband corresponds to the (scaled) difference between the corresponding pixels in the two frames.

In contrast, the temporal filtering unit 8 of the present invention only produces one sub-band or frame that corresponds to each frame. As previously described in regard to FIG. 2, the first frame or the last frame of the GOP may not be processed by the motion estimation unit 6 depending on whether backward, forward or bi-directional prediction is used. Thus, the temporal filtering unit 8 will not perform any filtering on either the first or last frame of the GOP, which will be defined as an A-frame. Further, the rest of the frames of the GOP will be temporally filtered by just taking the difference between the regions of each frame and the similar regions found in other frames of the GOP, which will be defined as an H-frame.

In particular, the temporal filtering unit 8 will filter a H-frame by first retrieving the similar regions that were matched to the regions in each H-frame. This will be done according to the motion vectors and frame reference numbers provided by the motion estimation unit 6. As previously described, the regions in each H-frame are matched to similar regions in other frames in the same GOP. After retrieving the similar regions, the temporal filtering unit 8 will then calculate the difference between the pixel values in the similar regions and the pixel values in the matched regions. Further, the temporal filtering unit 8 preferably would divide this difference by some scaling factor.

According to the present invention, the above-described MCTF scheme leads to an improved coding efficiency since the quality of best matches is significantly improved and the number of unconnected pixels is also reduced. In particular, simulations have shown that the number of unconnected pixels is reduced from thirty-four (34) percent to twenty-two (22) percent for each frame. However, the MCTF scheme of the present invention still produces some unconnected pixels. Therefore, the Temporal filtering unit 8 will handle these unconnected pixels, as described in Woods.

As can be seen, a spatial decomposition unit 10 is included to reduce the spatial redundancies in the frames provided by the MCTF unit 4. During operation, the frames received from the MCTF unit 4 are transformed into wavelet coefficients according to a 2D wavelet transform. There are many different types of filters and implementations of the wavelet transform.

Figure 3:
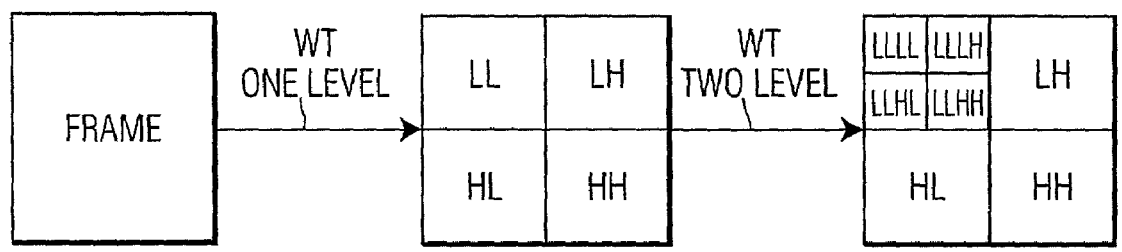
FIG. 3 a block diagram illustrating one example of a 2D wavelet transform.

One example of a suitable 2D wavelet transform is shown in FIG. 3. As can be seen, a frame is decomposed, using wavelet filters into low frequency and high frequency sub-bands. Since this is a 2-D transform there are three high frequency sub-bands (horizontal, vertical and diagonal). The low frequency sub-band is labeled the LL sub-band (low in both horizontal and vertical frequencies). These high frequency sub-bands are labeled LH, HL and HH, corresponding to horizontal high frequency, vertical high frequency and both horizontal and vertical high frequency. The low frequency sub-bands may be further decomposed recursively. In FIG. 3, WT stands for Wavelet transform. There are other well known wavelet transform schemes described in a book entittled "A Wavelet Tour of Signal Processing", by Stephane Mallat, Academic Press, 1997.

Referring back to FIG. 2, the encoder may also include a significance encoding unit 12 to encode the output of the spatial decomposition unit 10 according to significance information. In this example, significance may mean magnitude of the wavelet coefficient, where larger coefficients are more significant than smaller coefficients. In this example, the significance encoding unit 10 will look at the wavelet coefficients received from the spatial decomposition unit 10 and then reorder the wavelet coefficients according to magnitude. Thus, the wavelet coefficients having the largest magnitude will be sent first. One example of significance encoding is Set Partitioning in Hierarchical Trees (SPIHT). This is described in the article entitled "A New Fast and Efficient Image Codec Based on Set Partitioning in Hierarchical Tress," by A. Said and W. Pearlman, IEEE Transactions on Circuits and Systems for Video Technology, vol. 6, June 1996.

As can be seen from FIG. 2, dotted lines are included to indicate dependency between some of the operations. In one instance, the motion estimation 6 is dependent on the nature of the significance encoding 12. For example, the motion vectors produced by the motion estimation may be used to determine which of the wavelet coefficients are more significant. In another instance, the spatial decomposition 8 may also be dependent on the type of the significance encoding 12. For instance the number of levels of the wavelet decomposition may be related to the number of significant coefficients.

As can be further seen, an entropy encoding unit 14 is included to produce the output bitstream. During operation, an entropy coding technique is applied to encode the wavelet coefficients into an output bit-stream. The entropy encoding technique is also applied to the motion vectors and frame numbers provided by the motion estimation unit 6. This information is included in the output bit-stream in order to enable decoding. Examples of a suitable entropy encoding technique include variable length encoding and arithmetic encoding.

Figure 4:
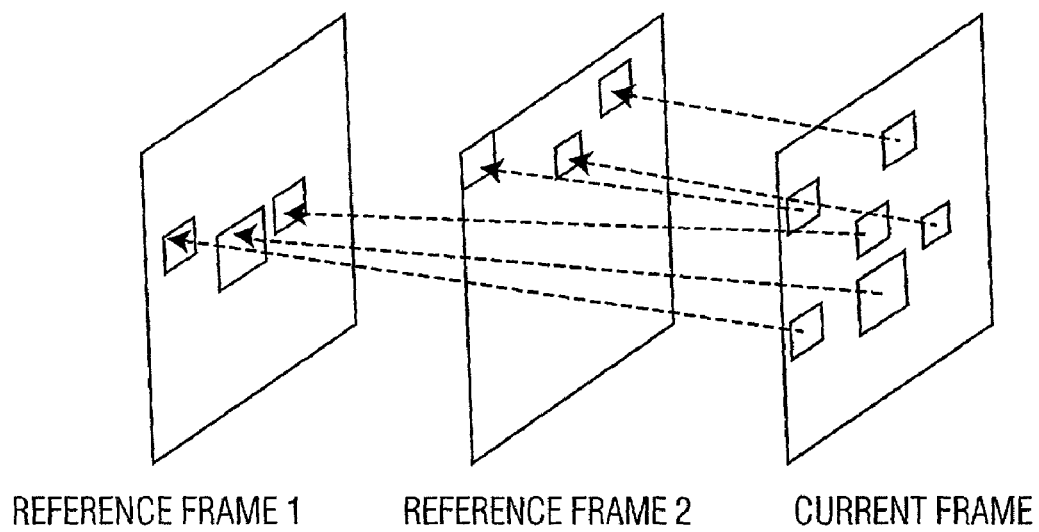
FIG. 4 is a diagram illustrating one example of motion estimation according to the present invention.

One example of motion estimation according to the present invention is shown in FIG. 4. As previously described, the motion estimation according to the present invention utilizes multiple reference frames. As can be seen from FIG. 4, backward prediction is used in this example. Thus, different blocks from the current frame being processed are matched to similar blocks in the previous frames. In this example, two reference frames are shown, however the number of reference frames may be fixed or adaptively chosen during the coding process. It should also be noted that in this example block based motion estimation techniques are utilized. Further, the strategies are hierarchical and allow for variable block sizes.

Figure 5:
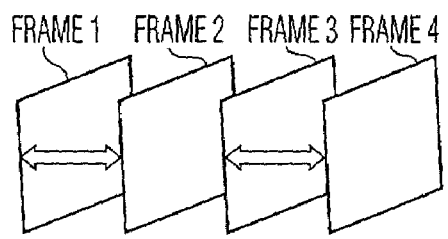
FIG. 5 is a diagram illustrating one example of temporal filtering according to the present invention.
Figure 5:
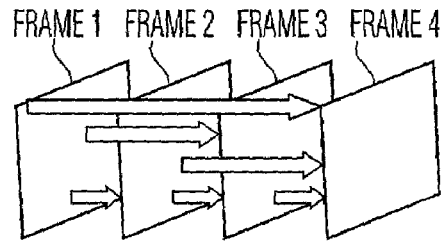
Figure 5:
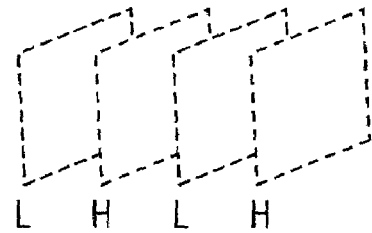
Figure 5:
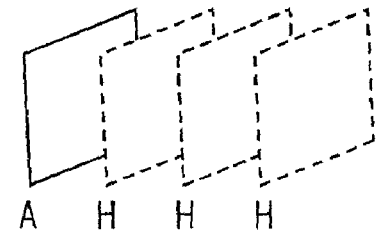

One example of temporal filtering according to the present invention is shown in FIG. 5. As can be seen, the old scheme is on the left side, while the new scheme according to the present invention is on the right side. In the old scheme, pixels from the current frame and from a single reference frame are filtered together to create a corresponding H and L frame. In contrast, in the new temporal filtering scheme, pixels from the current frame and from multiple reference frames are filtered together. In this example, backward prediction was utilized so that the reference frames are previous frames.

Moreover, since regions or groups of pixels from multiple reference frames are utilized in the new temporal filtering scheme, it is not necessary to create a corresponding L frame. Instead, a H-frame is created that corresponds to each of the frames in the GOP except for the first frame called an A-frame. The H-frames are produced by filtering each pixel from the current frame along with its match in the previous frames.

As can be further seen from the right side of FIG. 5, pixels from Frame 2 were matched to pixels in Frame 1, pixels from Frame 3 were matched to pixels in both the Frames 1 and 2, and pixels from Frame 4 were matched to pixels in the Frames 1, 2 and 3. Pixels from Frame 2 along with its corresponding matches are temporally filtered to create the corresponding H frame. Similarly, pixels from Frame 3 and 4 along with the corresponding matches are temporally filtered to create the corresponding H frames. As can be further seen from the right side of FIG. 1, the pixels from the Frame are not filtered and are passed on unchanged. As described previously, this type of frame is defined as an A-frame.

Figure 6:
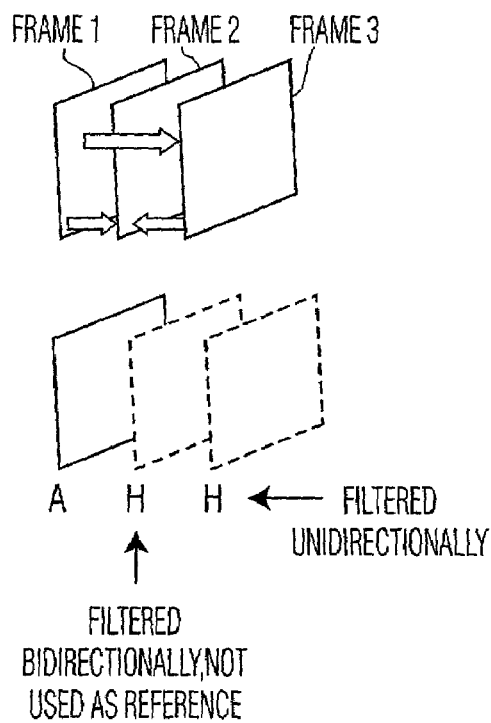
FIG. 6 is a diagram illustrating another example of temporal filtering according to the present invention.

Another example of temporal filtering according to the present invention is shown in FIG. 6. In this example, bi-directional prediction is utilized. As previously described, in bi-directional prediction, regions in each frame being processed may be matched to regions in both previous and proceeding frames. Then these regions are temporally filtered along with its matches in the previous and proceeding frames. Bi-directional filtering is desirable since it significantly improves performance for frames across scene changes or ones with many objects moving in the scene leading to occlusions. There is an overhead associated with coding a second set of motion vectors, however it is insignificant compared to the gains in coding efficiency As can be seen from FIG. 6, not all of the frames are filtered bi-directionally. For example, Frame 1 is not filtered since there are no previous frames in the group to use as a reference frame. Thus, frame 1 is passed unchanged and is defined as an A-frame. Further, Frame 3 is processed to produce an H-frame. However, since there are no proceeding frames available in the group to use as a reference frame, bi-directionally filtering cannot be used. Instead, Frame 3 is temporally filtered using previous frames. This means that backward prediction would be used to find matches in previous frames in order to perform the temporal filtering. In another example of the temporal filtering, the first frame in the GOP would be the uni-directional H-frame and the last frame would be the A-frame. In this example, forward prediction would be used to find matches in proceeding frames in order to perform the temporal filtering.

As can be seen, Frame 2 is a H frame that is filtered bi-directionally. However, not all of the regions in Frame 2 can be filtered bi-directionally. For example, a region may only be matched to a region in a previous frame. Thus, such a region would be filtered based on matches in previous frames using backward prediction. Similarly, a region that was only matched to a region in a proceeding frame would be filtered accordingly using forward prediction.

In the case where a region is matched to regions in both a pervious and proceeding frame, bi-directional filtering is performed. Thus, the corresponding pixels of the regions in the previous and proceeding frames are averaged. The average is then subtracted from corresponding pixels in the frame being filtered, which in this example is Frame 2. As previously described, this difference may be preferably divided by some scaling factor. In order to simplify decoding, it is preferable not to use the bi-directionally H-frames as reference frames. This is because to decode a bi-directionally frame, the pervious and proceeding frame must be decoded first. Therefore, in other examples, where multiple bi-directional frames are included in a GOP, it may be necessary to include a number of other uni-directional H frames.

Figure 7:
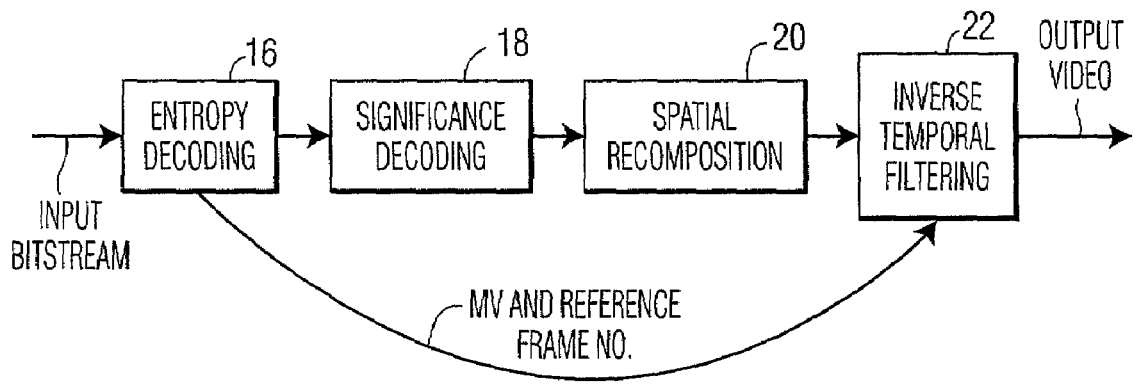
FIG. 7 is one example of a decoder according to the present invention.

One example of a decoder according to the present invention is shown in FIG. 7. As previously described in regard to FIG. 2, the input video is divided into GOPs and each GOP is encoded as a unit. Thus, the input bit-stream may include one or more GOPs that will be decoded as a unit. The bit-stream will also include a number of motion vectors MV and frame numbers that correspond to each frame in the GOP that was previously motion compensated temporally filtered. The motion vectors and frame numbers will indicate regions in other frames in the same GOPs that were previously matched to regions in each of the frames that have been temporally filtered.

As can be seen, the decoder includes an entropy decoding unit 16 for decoding the incoming bit-stream. During operation, the input bit-stream will be decoded according to the inverse of the entropy coding technique performed on the encoding side. This entropy decoding will produce wavelet coefficients that correspond to each GOP. Further, the entropy decoding produces a number of motion vectors and frame numbers that will be utilized later.

A significance decoding unit 18 is included in order to decode the wavelet coefficients from the entropy decoding unit 16 according to significance information. Therefore, during operation, the wavelet coefficients will be ordered according to the correct spatial order by using the inverse of the technique used on the encoder side. As can be further seen, a spatial recomposition unit 20 is also included to transform the wavelet coefficients from the significance decoding unit 18 into partially decoded frames. During operation, the wavelet coefficients corresponding to each GOP will be transformed according to the inverse of the 2D wavelet transform performed on the encoder side. This will produce partially decoded frames that have been motion compensated temporally filtered according to the present invention.

As previously described, the motion compensated temporal filtering according to the present invention resulted in each GOP being represented by a number of H-frames and an A-frame. The H-frame being the difference between each frame in the GOP and the other frames in the same GOP, and the A-frame being either the first or last frame not processed by the motion estimation and temporal filtering on the encoder side. The A-frame may represent either the first or last frame in the GOP depending on what type of prediction was performed.

An inverse temporal filtering unit 22 is included to reconstruct the H-frames included in each GOP from the spatial recomposition unit 20 by performing the inverse of the temporal filtering performed on the encoder side. First, if the H-frames on the encoder side were divided by some scaling factor, the frames from the spatial recomposition unit 20 will be multiplied by the same factor. Further, the temporal filtering unit 22 will then reconstruct the H-frames included in each GOP based on the motion vectors MV and frame numbers provided by the entropy decoding unit 16.

In order to reconstruct the H-frames, it will be first determined where the A-frame is located within each GOP. If on the encoding side backward motion estimation was used, the A-frame would be the first frame in the GOP in this example. Thus, the inverse temporal filtering unit 22 will begin reconstructing the second frame in the GOP. In particular, the second frame will be reconstructed by retrieving the pixel values according the motion vectors and frame numbers provided for that particular frame. In this case, the motion vectors will point to regions within the first frame, which is the A-frame. The inverse temporal filtering unit 22 will then add the retrieved pixel values to corresponding regions in the second frame and therefore convert the difference into actual pixel values. The next frame is then similarly reconstructed using the first and second frame as references and so on until all of the frames in the GOP are reconstructed.

If on the encoder side forward motion estimation was used, the A-frame would be the last frame in the GOP in this example. Thus, the inverse filtering unit 22 will begin reconstructing the second to last frame in the GOP. The second to last frame will be reconstructed by retrieving the pixel values according the motion vectors and frame numbers provided for that particular frame. In this case, the motion vectors will point to regions within the last frame, which is the A-frame. The inverse temporal filtering unit 22 will then add the retrieved pixel values to corresponding regions in the second to last frame and therefore convert the difference into an actual pixel value. The next frame is then similarly reconstructed using the last and second to last frame as references and so on until all of the frames in the GOP are reconstructed.

If on the encoder side bi-directional motion estimation was used, the A-frame would be either the first or last frame in the GOP depending on which example was implemented. Thus, the inverse filtering unit 22 will begin reconstructing either the second or second to last frame in the GOP. Similarly, this frame will be reconstructed by retrieving the pixel values according the motion vectors and frame numbers provided for that particular frame.

As previously described, the bi-directional H-frames may include regions that were filtered based on matches from previous frames, proceeding frames or both. For the matches from just the previous or proceeding frames, the pixel values will be just retrieved and added to the corresponding region in the current frame being processed. For the matches from both, the values from both the previous and proceeding frame will be retrieved and then averaged. This average will then be added to the corresponding region in the current frame being processed.

If the GOP includes additional bi-directional H-frames, these frames will be also reconstructed, as described above. As previously described in regard to the bi-directional temporal filtering, uni-directional H-frames may also be included along with the bi-directional H-frames. In order to reconstruct the uni-directional frames, inverse temporal filtering will be performed on either previous or proceeding frames depending on whether backward or forward prediction was performed on the encoder side.

Figure 8:
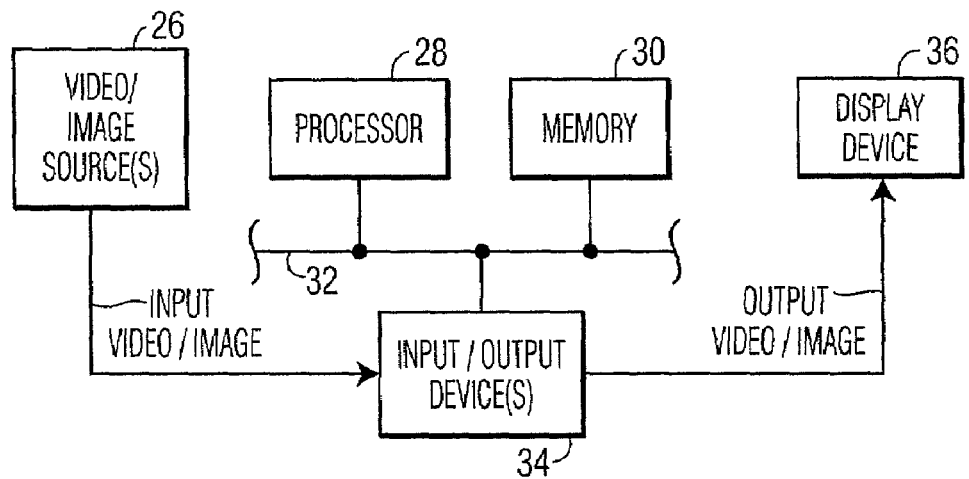
FIG. 8 is one example of a system according to the present invention.

One example of a system in which the wavelet based coding utilizing multiple reference frames for motion compensation temporal filtering according to the present invention may be implemented is shown in FIG. 8. By way of example, the system may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system includes one or more video sources 26, one or more input/output devices 34, a processor 28, a memory 30 and a display device 36.

The video/image source(s) 26 may represent, e.g., a television receiver, a VCR or other video/image storage device. The source(s) 26 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 34, processor 28 and memory 30 communicate over a communication medium 32. The communication medium 32 may represent, e.g., a bus, a communication network, one or more internal connections of a circuit, circuit card or other device, as well as portions and combinations of these and other communication media. Input video data from the source(s) 26 is processed in accordance with one or more software programs stored in memory 30 and executed by processor 28 in order to generate output video/images supplied to the display device 36.

In particular, the software programs stored on memory 30 includes the wavelet based coding utilizing multiple reference frames for motion compensation temporal filtering, as described previously in regard to FIGS. 2 and 7. In this embodiment, the wavelet based coding utilizing multiple reference frames for motion compensation temporal filtering is implemented by computer readable code executed by the system. The code may be stored in the memory 30 or read/downloaded from a memory medium such as a CD-ROM or floppy disk. In other embodiments, hardware circuitry may be used in place of, or in combination with, software instructions to implement the invention.

While the present invention has been described above in terms of specific examples, it is to be understood that the invention is not intended to be confined or limited to the examples disclosed herein. Therefore, the present invention is intended to cover various structures and modifications thereof included within the spirit and scope of the appended claims.

What is claimed is:

1. A method for encoding a group of video frames, comprising the steps of:
   matching regions in at least one frame in the group to regions in multiple reference frames;
   calculating a difference between pixel values of the regions in the at least one frame and the regions in the multiple reference frames forming a frame with a single sideband only;
   transforming the frame into wavelet coefficients.

2. The method of claim 1, wherein the multiple reference frames are previous frames in the group.

3. The method of claim 1, wherein the multiple reference frames are proceeding frames in the group.

4. The method of claim 1, wherein the multiple reference frames are previous and proceeding frames in the group.

5. The method of claim 1, which further includes dividing the difference between pixels in the regions in the at least frame and the regions in the multiple frames by a scaling factor.

6. The method of claim 1, which further includes encoding the wavelet coefficients according to significance information.

7. The method of claim 1, which further includes entropy encoding the wavelet coefficients.

8. A computer readable memory medium including code for encoding a group of video frames, the code comprising:
   a code for matching regions in at least one frame in the group to regions in multiple reference frames;
   a code for calculating a difference between pixel values of the regions in the at least one frame and the regions in the multiple reference frames forming a frame with a single sideband only;
   a code for transforming the frame into wavelet coefficients.

9. A device for encoding a video sequence, comprising:
   a partition unit for dividing the video sequence into groups of frames;
   a unit for motion compensated temporally filtering at least one frame in each group using multiple reference frames forming frame with a single sideband only; and
   a spatial decomposition unit for transforming each group into wavelet coefficients.

10. The device of claim 9, wherein the motion compensated temporally filtering unit includes:
    a motion estimation unit for matching regions in the at least one frame to regions in the multiple reference frames; and
    a temporal filtering unit for calculating a difference between pixel values of the regions in the at least frame and the regions in the multiple reference frames forming the frame with the single sideband only.

11. The device of claim 9, wherein the multiple reference frames are previous frames in the same group.

12. The device of claim 9, wherein the multiple reference frames are proceeding frames in the same group.

13. The device of claim 9, wherein the multiple reference frames are previous and proceeding frames in the same group.

14. The device of claim 10, wherein the temporal filtering unit divides the difference between pixels in the regions in the at least one frame and the regions in the multiple reference frames by a scaling factor.

15. The device of claim 9, which further includes a unit for encoding the wavelet coefficients according to significance information.

16. The device of claim 9, which further includes an entropy encoding unit for encoding the wavelet coefficients into a bit-stream.

17. A method of decoding a bit-stream including a group of encoded video frames, comprising the steps of:
    entropy decoding the bit-stream to produce wavelet coefficients;
    transforming the wavelet coefficients into partially decoded frames including at least one frame including a single sideband only; and
    inverse temporal filtering the at least one frame using multiple reference frames.

18. The method of claim 17, wherein the inverse temporal filtering includes:
    retrieving regions from the multiple reference frames previously matched to regions in the at least one frame; and
    adding pixel values of the regions in the multiple reference frames to pixel values of the regions in the at least one frame.

19. The method of claim 18, wherein the step of retrieving regions from multiple reference frames is performed according to motion vectors and frame numbers included in the bit-stream.

20. The method of claim 17, wherein the multiple reference frames are previous frames in the group.

21. The method of claim 17, wherein the multiple reference frames are proceeding frames in the group.

22. The method of claim 17, wherein the multiple reference frames are previous and proceeding frames in the group.

23. The method of claim 17, which further includes multiplying the at least one frame by a scaling factor.

24. The method of claim 17, which further includes decoding the wavelet coefficients according to significance information.

25. A computer readable memory medium including code for decoding a bit-stream including a group of encoded video frames, the code comprising:
    a code for entropy decoding the bit-stream to produce wavelet coefficients;

a code for transforming the wavelet coefficients into partially decoded frames including at least one frame including a single sideband only; and a code for inverse temporal filtering the at least one frame using multiple reference frames.

26. A device for decoding a bit-stream including a group of encoded video frames, comprising:

an entropy decoding unit for decoding the bit-stream into wavelet coefficients;

a spatial recomposition unit for transforming the wavelet coefficients into partially decoded frames including at least one frame including a single sideband only; and an inverse temporal filtering unit for retrieving regions from multiple reference frames previously matched to regions in at least one frame and adding pixel values of the regions in the multiple reference frames to pixel values of the regions in the at least one frame.

27. The device of claim 26, wherein the retrieving regions from multiple reference frames is performed according to motion vectors and frame numbers included in the bit-stream.

28. The device of claim 26, wherein the inverse temporal filtering unit multiplies the at least one frame by a scaling factor.

29. The device of claim 26, which further includes a significance decoding unit for decoding the wavelet coefficients according to significance information.

* * * * *